United States Patent
Delfino et al.

(10) Patent No.: US 10,346,005 B2
(45) Date of Patent: Jul. 9, 2019

(54) COMPUTER-IMPLEMENTED METHOD FOR DETERMINING EXPLODED PATHS OF AN EXPLODED VIEW OF AN ASSEMBLY OF THREE-DIMENSIONAL MODELED OBJECTS

(71) Applicant: Dassault Systemes, Velizy Villacoublay (FR)

(72) Inventors: Christophe Rene Francis Delfino, Saint Laurent du Var (FR); Guillaume Romain Dayde, Grasse (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 67 days.

(21) Appl. No.: 14/331,818

(22) Filed: Jul. 15, 2014

(65) Prior Publication Data

US 2015/0026645 A1     Jan. 22, 2015

(30) Foreign Application Priority Data

Jul. 18, 2013  (EP) .................................... 13306032

(51) Int. Cl.
*G06F 3/0484*     (2013.01)
*G06T 19/00*      (2011.01)

(52) U.S. Cl.
CPC .......... *G06F 3/04842* (2013.01); *G06T 19/00* (2013.01)

(58) Field of Classification Search
CPC .............................. G06F 3/04842; G06T 19/00
See application file for complete search history.

(56) References Cited

U.S. PATENT DOCUMENTS 3,232,136 A * 2/1966 Bahmuller ............. A47C 1/026
                                                    297/366
4,726,638 A * 2/1988 Farrar ................ H01R 13/6666
                                                    333/185

(Continued)

FOREIGN PATENT DOCUMENTS

CN      1755733        4/2006
EP      1 596 338      11/2005

(Continued)

OTHER PUBLICATIONS

Rakesh (https://web.archive.org/web/20130420183157/http://grabcad.com/questions/how-to-add-exploded-view-in-drawing; "How to add exploded view in drawing"; pub date: Apr. 18, 2013; last accessed May 12, 2016).*

(Continued)

*Primary Examiner* — Jung-Mu T Chuang
(74) *Attorney, Agent, or Firm* — Hamilton, Brook, Smith & Reynolds, P.C.

(57) ABSTRACT

A computer-implemented method for determining exploded path of an exploded view of an assembly of three-dimensional modeled objects comprising the steps of displaying (1) in a main frame an exploded view of the assembly in a scene; computing (2) at least one set of exploded paths, an exploded path corresponding to a set of at least one exploded line linking at least one object of the assembly; displaying (3) a list of thumbnails, a thumbnail corresponding to at least one possible set of computed exploded paths of the assembly; selecting (4) one thumbnail among the list of thumbnails; and displaying (5) the selected thumbnail.

12 Claims, 7 Drawing Sheets

(56) References Cited

U.S. PATENT DOCUMENTS

| | | | | |
|---|---|---|---|---|
| 5,282,140 | A * | 1/1994 | Tazawa | G06F 17/5018 345/420 |
| 5,771,043 | A * | 6/1998 | Nigawara | G05B 19/41805 345/419 |
| 5,941,281 | A * | 8/1999 | Baumann | F16K 47/08 137/625.33 |
| 5,992,643 | A * | 11/1999 | Scrogham | B01D 29/111 210/439 |
| 6,263,158 | B1 * | 7/2001 | Rutherford | H05B 3/36 219/544 |
| 6,295,063 | B1 * | 9/2001 | Minami | G06T 13/20 345/419 |
| 6,334,453 | B1 * | 1/2002 | Thompson | H01L 21/67126 134/140 |
| 6,496,195 | B1 * | 12/2002 | Gill | G06T 19/00 345/522 |
| 6,725,184 | B1 * | 4/2004 | Gadh | G05B 19/41805 700/95 |
| 6,826,500 | B2 * | 11/2004 | Linthicum | G06F 17/50 702/98 |
| 6,876,359 | B2 * | 4/2005 | Minami | G06T 13/20 345/419 |
| 7,066,964 | B2 * | 6/2006 | Wild | A61F 2/644 623/42 |
| 7,290,221 | B2 * | 10/2007 | Anderson | G06T 17/20 715/848 |
| 7,295,201 | B2 * | 11/2007 | Davis | G06T 11/206 345/419 |
| 7,295,719 | B2 * | 11/2007 | Robertson | G06F 17/30256 382/305 |
| 7,372,472 | B1 * | 5/2008 | Bordeleau | G06T 13/60 345/473 |
| 7,714,860 | B2 * | 5/2010 | Trotta | G06T 17/00 345/427 |
| 8,046,676 | B2 * | 10/2011 | Garcia | G06F 3/0482 715/211 |
| 8,175,933 | B2 * | 5/2012 | Cook, Jr. | G06Q 10/10 705/26.5 |
| 8,430,916 | B1 * | 4/2013 | Winslow | A61B 17/7001 606/250 |
| 8,452,435 | B1 * | 5/2013 | Vieilly | G06T 19/20 345/418 |
| 8,479,628 | B2 * | 7/2013 | Dale | B27B 17/00 83/13 |
| 8,544,455 | B1 * | 10/2013 | Bruington | F41B 7/04 124/22 |
| 8,707,214 | B2 * | 4/2014 | Horvitz | G06F 17/30716 715/838 |
| 8,723,454 | B2 * | 5/2014 | Skinner | E06B 9/322 318/16 |
| 8,789,741 | B2 * | 7/2014 | Baxter, III | A61B 17/07207 227/176.1 |
| 8,904,287 | B2 * | 12/2014 | Kumar | G06F 3/0482 715/711 |
| 9,053,258 | B2 * | 6/2015 | Xin | G06F 3/04845 |
| 9,081,470 | B2 * | 7/2015 | Moore | G06F 3/0481 |
| 9,135,372 | B2 * | 9/2015 | Delarue | G06F 3/0482 |
| 9,489,689 | B2 * | 11/2016 | Stewart | H04N 21/23614 |
| 2001/0012021 | A1 * | 8/2001 | Nishiyama | G05B 19/409 715/763 |
| 2001/0027429 | A1 * | 10/2001 | Uemura | G06Q 10/087 705/26.8 |
| 2002/0087423 | A1 * | 7/2002 | Carbrey Palango | G06Q 10/087 705/26.5 |
| 2003/0043177 | A1 * | 3/2003 | Kawai | G06T 19/00 715/700 |
| 2003/0097195 | A1 * | 5/2003 | Yamrom | G06T 19/20 700/95 |
| 2003/0142091 | A1 * | 7/2003 | Minami | G06T 13/20 345/419 |
| 2004/0019534 | A1 * | 1/2004 | Callahan | G06Q 10/087 705/26.8 |
| 2004/0249727 | A1 * | 12/2004 | Cook, Jr. | G06Q 10/10 705/26.81 |
| 2005/0203639 | A1 * | 9/2005 | Wild | A61F 2/644 623/44 |
| 2005/0204277 | A1 * | 9/2005 | Garcia | G06F 3/0482 715/211 |
| 2005/0237322 | A1 * | 10/2005 | Minami | G06T 13/20 345/419 |
| 2005/0248560 | A1 * | 11/2005 | Agrawala | G06T 19/00 345/418 |
| 2006/0195057 | A1 * | 8/2006 | Kriesel | A61M 5/141 604/19 |
| 2006/0218478 | A1 * | 9/2006 | Nonclercq | G06T 11/206 715/206 |
| 2007/0050412 | A1 * | 3/2007 | Robertson | G06F 17/30256 |
| 2007/0070073 | A1 * | 3/2007 | Davis | G06T 11/206 345/474 |
| 2007/0288210 | A1 * | 12/2007 | Powell | G06T 17/20 703/2 |
| 2009/0199127 | A1 * | 8/2009 | Sareen | G06F 3/0481 715/781 |
| 2009/0312860 | A1 * | 12/2009 | Beucker | G06Q 10/10 700/107 |
| 2010/0010655 | A1 * | 1/2010 | Corcoran | G06F 17/50 700/98 |
| 2010/0132839 | A1 * | 6/2010 | Dale | B27B 17/00 144/2.1 |
| 2010/0318929 | A1 * | 12/2010 | Hilton | G06F 3/0486 715/769 |
| 2011/0265958 | A1 * | 11/2011 | Skinner | E06B 9/322 160/127 |
| 2011/0274250 | A1 * | 11/2011 | Gray | G01V 5/0025 378/87 |
| 2012/0049561 | A1 * | 3/2012 | Young | B60K 37/02 296/70 |
| 2012/0075433 | A1 * | 3/2012 | Tatzgern | G06T 11/60 348/50 |
| 2012/0145673 | A1 * | 6/2012 | Murokh | A61L 2/14 216/94 |
| 2013/0067354 | A1 * | 3/2013 | O'Shaugnessy | G06Q 10/107 715/752 |
| 2013/0248000 | A1 * | 9/2013 | Killeen | F17D 3/00 137/14 |
| 2014/0026087 | A1 * | 1/2014 | Reid | G06F 8/34 715/765 |
| 2014/0088482 | A1 * | 3/2014 | Schlaeper | A61M 1/367 604/6.1 |
| 2014/0146088 | A1 * | 5/2014 | Wyrwas | G09G 5/10 345/690 |
| 2014/0207607 | A1 * | 7/2014 | Goodwin | G06Q 30/0621 705/26.5 |
| 2014/0281969 | A1 * | 9/2014 | Kumar | G06F 3/0482 715/711 |
| 2014/0342855 | A1 * | 11/2014 | Thurman | G06Q 30/0621 473/564 |
| 2014/0343898 | A1 * | 11/2014 | Thurman | G06Q 30/0631 702/189 |
| 2015/0107681 | A1 * | 4/2015 | Killeen | F17D 3/00 137/12 |

FOREIGN PATENT DOCUMENTS

| | | |
|---|---|---|
| JP | 10312208 | 11/1998 |
| JP | 2002304394 A | 10/2002 |
| JP | 2005322253 A | 11/2005 |
| JP | 2007102320 A | 4/2007 |

OTHER PUBLICATIONS

Todd (http://www.cadalyst.com/manufacturing/alibre-options-creating-exploded-views-use-2d-drawings-10454 by Michael Todd; pub date: Jul. 15, 2005; last accessed May 12, 2016).*

SolidEdge (https://support.industrysoftware.automation.siemens.

(56) References Cited

OTHER PUBLICATIONS com/training/se/en/ST4/pdf/spse01691-s-1040_en.pdf; "Exploding Assemblies"; pub date: 2011; last accessed Jan. 26, 2017).*
Ritter et al. (http://graphicsinterface.org/wp-content/uploads/gi2000-23.pdf; pub date: May 2000; last accessed Jul. 15, 2017).*
The Essential Guide to User Interface Design by Galitz 2002.*
European Search Report for EP 13306032.7 dated Jan. 28, 2014.
Mok, S., et al. "Automatic Generation of Assembly Instructions using STEP" Proceedings of the 2001 IEEE International Conference on Robotics & Automation, Seoul, Korea, pp. 313-314, May 21-26, 2001.
Li, W., et al. "Automated Generation of Interactive 3D Exploded View Diagrams", ACM Transaction of Graphics, vol. 27, No. 3, Article 101 (pp. 1-7), Aug. 1, 2008.

* cited by examiner

COMPUTER-IMPLEMENTED METHOD FOR DETERMINING EXPLODED PATHS OF AN EXPLODED VIEW OF AN ASSEMBLY OF THREE-DIMENSIONAL MODELED OBJECTS

RELATED APPLICATION(S)

This application claims priority under 35 U.S.C. § 119 or 365 to European Application No. 13306032.7, filed Jul. 18, 2013. The entire teachings of the above application(s) are incorporated herein by reference.

FIELD OF THE INVENTION

The invention relates to the field of computers programs and systems, and more specifically to the field of computer-implemented method for designing and/or authoring technical illustrations, or, more precisely for determining exploded paths of an exploded view of an assembly of three-dimensional modeled objects.

BACKGROUND

A number of systems and programs are offered on the market for designing and/or authoring technical illustrations, as mounting or dismounting illustrations such as the one provided by Dassault Systèmes under the trademark 3D VIA® Composer.

These systems, mainly dedicated to non-CAD software users, allow a user to produce, for instance, technical illustrations, maintenance or training operations, assembly or disassembly instructions, marketing presentations, or interactive applications (like interactive parts catalogues . . . ).

In these systems, there exist some advanced tools to create exploded view of a 3D product, but none of them provide solutions for easily drawing exploded paths in 3D.

Indeed, making exploded paths is fastidious and time-consuming as many manual operations are necessary, either by manually linking or connecting points, or by using a set of broken lines for one piece.

An exploded view represents an assembly of objects spread out according to their relationship, in particular objects positioned to show how they fit together when assembled. An exploded path allows to represent links between objects of an exploded view of the assembly, notably to explain an order for mounting or dismounting these objects of the assembly.

Thus, it is difficult and time consuming to create one or several exploded paths on an exploded view of an assembly of three-dimensional modeled objects.

SUMMARY OF THE INVENTION

A goal of the invention is to provide a computer-implemented method and a system to overcome the above mentioned problems.

It is proposed, according to one aspect of the invention, a computer-implemented method for determining exploded paths of an exploded view of an assembly of three-dimensional modeled objects comprising the steps of:
 displaying in a main frame an exploded view of the assembly in a scene;
 computing at least one set of exploded path, an exploded path corresponding to a set of at least one exploded line linking at least one object of the assembly;
 displaying a list of thumbnails, a thumbnail corresponding to at least one possible set of computed exploded paths of the assembly;
 selecting one thumbnail among the list of thumbnails; and
 displaying the selected thumbnail.

Such a computer-implemented method allows easily and quickly to create several exploded paths on an exploded view of an assembly of three-dimensional modeled objects.

The user will be able to see several possibilities, he might not even be thinking of. Therefore the invention is more than a mere presentation of information as a step of computing of the different possibilities is involved.

According to an embodiment, an exploded line of an exploded path comprises:
 at least one line linking two positions of at least one object, being a segment or a curve; and/or
 at least one custom line comprising at least one line with a constraint set of at least one geometrical constraint.

With combination of such exploded lines (segment or curve) and exploded custom lines, each exploded path is possible, and the invention provides to the user the right path he was looking for between his initial selection of objects or parts of the assembly.

According to an embodiment, the step of selecting one thumbnail among the list of thumbnails is preceded by a step of previewing at least one thumbnail of the list of thumbnails.

Such a previewing allows facilitating the choice of the selection of the selection of the thumbnail among the list of thumbnails.

According to an embodiment, the step of displaying the selected thumbnail (TH3) is performed by replacement of the current view in the main frame, or in other words by replacement of the previously displayed exploded view or exploded path in the main frame.

Thus, in the main frame, the content of the selected thumbnail replaces the previous view.

According to an embodiment, the step of selecting one thumbnail among the list of thumbnails is preceded by a step of previewing at least one thumbnail of the list of thumbnails in the main frame.

Thus, before any action, the user can see a displayed result.

According to an embodiment, said constraint set comprises at least one constraint among a passage area, a waypoint, an axis, an avoid area, and an avoid point.

Thus, it is possible to create any type of exploded path.

According to an embodiment, the steps of computing and of displaying the list of thumbnails use a scheduling criterion.

Thus, with a scheduling criterion, the list of thumbnails corresponding to different representations of one set of computed exploded paths of the assembly, can be ordered, to facilitate the selection of the thumbnail among the list of thumbnails.

According to an embodiment, said scheduling criterion uses at least one geometrical criterion among a criteria set comprising: collinearity of parts of a representation of one set of computed exploded paths of the assembly, passing through identical points for parts of a representation of one set of computed exploded paths of the assembly, and a preferred direction of parts of a representation of one set of computed exploded paths of the assembly.

Thus, with such a criterion, the user can have, for different assemblies, representations of exploded paths always having consistency in their occurrence. Thus a preferred choice type of the user can be further identified.

According to an embodiment, the step of selecting one thumbnail among the list of thumbnails uses automatically by default said scheduling criterion with the displaying of the thumbnail of the list of thumbnails having the best value of said scheduling criterion.

Thus it can be possible to generate an automatic selection, or an automatic preselection before the selection of a thumbnail among the list of thumbnails.

According to an embodiment, the steps of previewing at least one thumbnail of the list of thumbnails and of selecting one thumbnail among the list of thumbnails comprise the use of a choice selector.

As automatic creation of exploded path among several objects may lead to multiple solutions, a choice selector should display a list of thumbnails presenting the various possibilities the user has.

The choice selector allows the user to have a real time visualization of what will be the final result and allows him taking faster decisions.

According to an embodiment, the choice selector is adapted to be controlled by pointing means.

Pointing means can comprise a computer mouse, a touchpen, or a sensitive touchscreen.

According to an embodiment, the step of previewing uses a first interaction with the choice selector, and the step of selecting uses a second interaction with the choice selector.

For example, the couple of first interaction and second interaction can be respectively a first click and a second click, or the hovering of the thumbnail and a click, or a click and a double click . . . .

It is also proposed, according to another aspect of the invention, a computer-readable medium having computer-executable instructions to cause the computer system to perform the method for determining exploded paths of an exploded view of an assembly of three-dimensional modeled objects as described above.

It is also proposed, according to another aspect of the invention, a computer program product, stored on a computer readable medium, for determining exploded paths of an exploded view of an assembly of three-dimensional modeled objects, comprising code means for causing the system to take the steps of the method as described above.

It is also proposed, according to another aspect of the invention, an apparatus for determining exploded paths of an exploded view of an assembly of three-dimensional modeled objects comprising means for implementing the steps of the method as described above.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

The invention will be better understood with the study of some embodiments described by way of non-limiting examples and illustrated by the accompanying drawings wherein.

DETAILED DESCRIPTION OF THE INVENTION

A description of example embodiments of the invention follows.

The teachings of all patents, published applications and references cited herein are incorporated by reference in their entirety.

Following figures explain more in details the functioning of the present invention.

Figure 1:
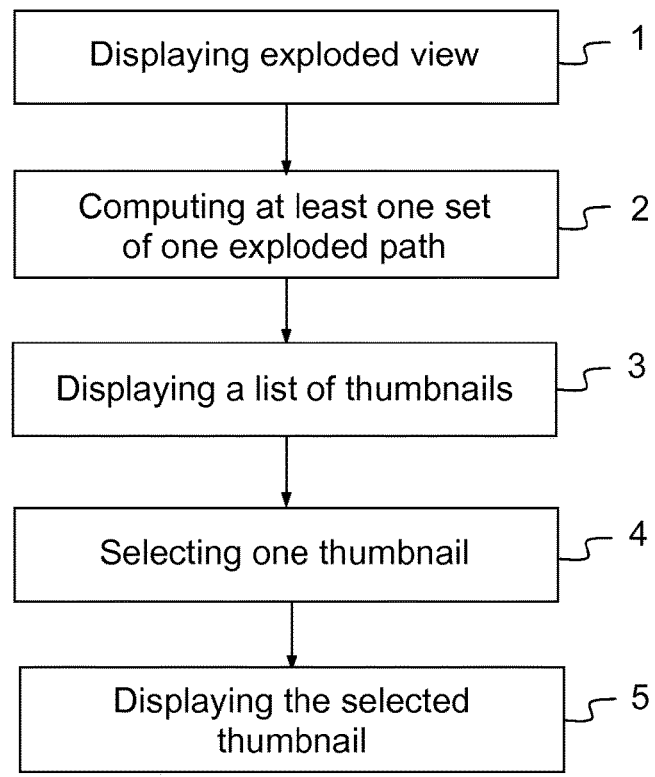
FIGS. 1 to 6 illustrate an example of a method according to an aspect of the invention.

The FIG. 1 illustrate the steps of the present computer-implemented method for determining exploded paths of an exploded view of an assembly of three-dimensional modeled objects.

The method comprises a step 1 of displaying an exploded view of the assembly in a scene, and a step 2 of computing at least one set of exploded paths, an exploded path corresponding to a set of at least one exploded line linking at least one object of the assembly.

Alternatively, the present computer-implemented method can be easily adapted to determine at least one exploded paths of an exploded view of an assembly of three-dimensional modeled objects, especially by adapting step 2 for computing at least one set of at least one exploded path.

Furthermore, the method comprises a step 3 of displaying a list of thumbnails, a thumbnail corresponding to at least one possible set computed exploded paths of the assembly, and a step 4 of selecting one thumbnail among the list of thumbnails, and a step 5 of displaying the selected thumbnail.

The following FIGS. 2 to 6 illustrate more precisely an embodiment of a method according to an aspect of the invention.

Figure 2:
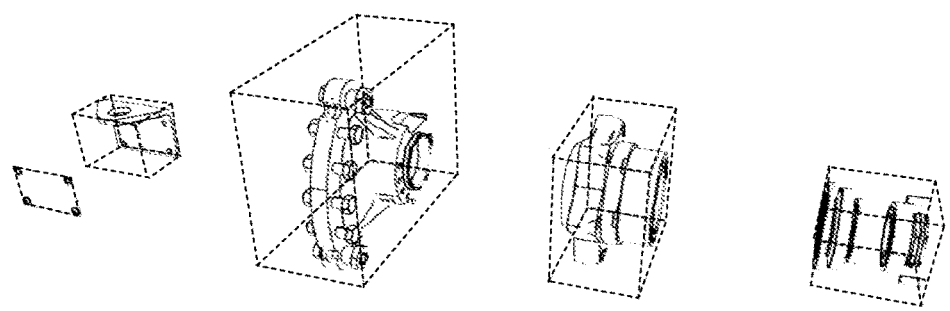

As illustrated on FIG. 2, the user can achieve this kind of visual result by initiating an exploded view.

In the present example, the exploded view displayed comprises bounding boxes bounding a set of objects of the assembly, but it is of course a non-limiting example.

Figure 3:
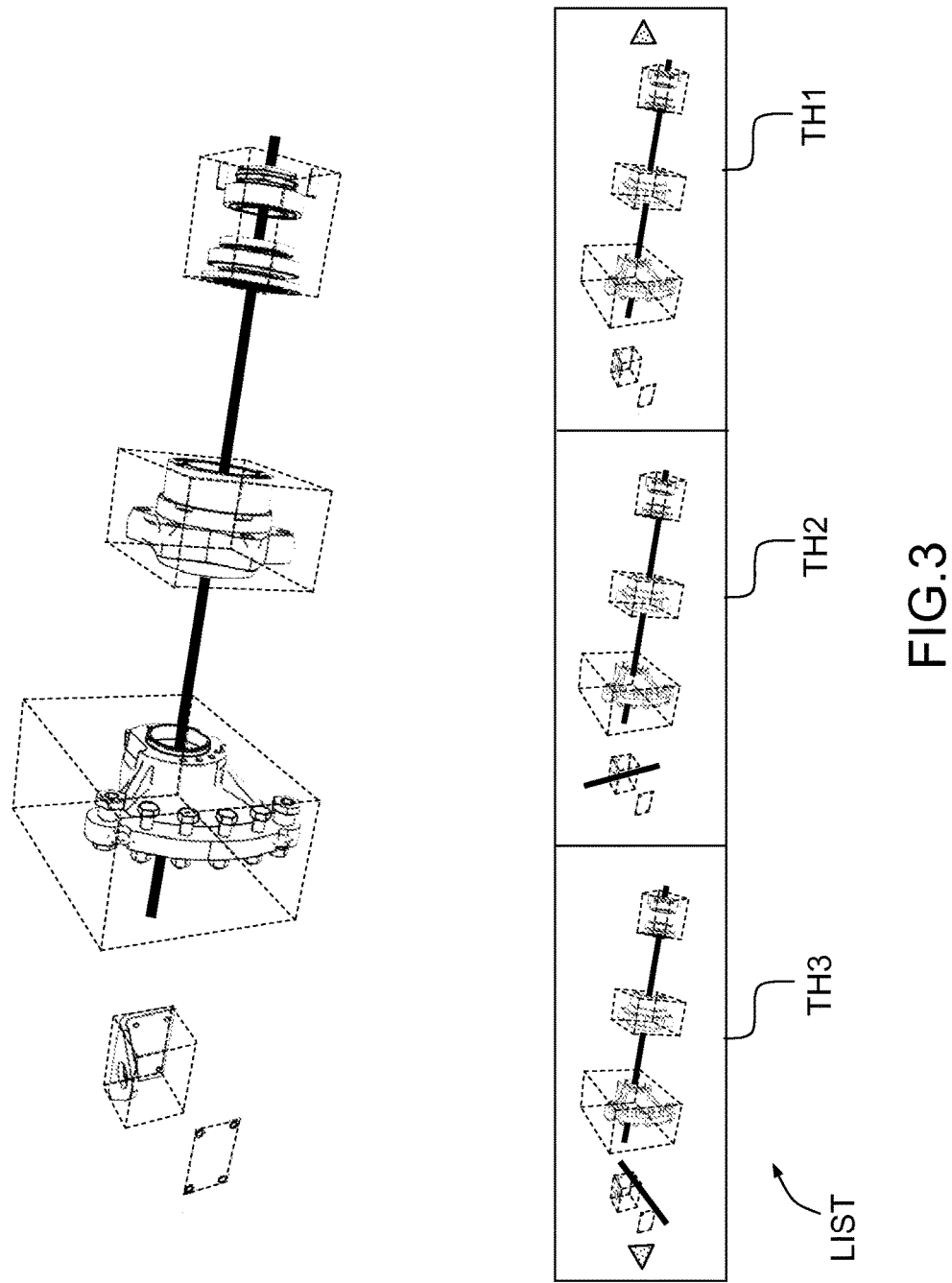

On FIG. 3, a step of computing one set of at least one exploded line linking at least one object of the assembly has been performed.

On the present example is displayed, in the main frame, the content of a thumbnail of a list LIST of thumbnails TH1, TH2, TH3 corresponding to different set of computed exploded paths of the assembly.

Thus, in the main frame, the content of a thumbnail replaces the previous view of the main frame.

An exploded path respectively corresponding to a set of at least one exploded line linking at least one object of the assembly.

An exploded line of an exploded path comprises at least one line linking two positions of at least one object, being a segment or a curve, and/or at least one custom line comprising at least one line with a constraint set of at least one geometrical constraint.

Said constraint set comprises at least one constraint among a passage area, a waypoint, an axis, an avoid area, and an avoid point.

On the present example of FIG. 3, the exploded paths computed are axial exploded paths, i.e exploded segments with a constraint of passage by the centers of the objects of the assembly.

On the present example, the thumbnails TH1, TH2, TH3 of the list are ordered according to a scheduling criterion, in the present case, from the right hand to the left hand. By default, the exploded path of the thumbnail TH1 having the best value of the scheduling criterion can, like in the present example, be displayed in the main frame.

The scheduling criterion uses at least one geometrical criterion among a criteria set comprising: collinearity of parts of a representation of one set of computed exploded paths of the assembly, passing through identical points for parts of a representation of one set of computed exploded paths of the assembly, and a preferred direction of parts of a representation of one set of computed exploded paths of the assembly.

The launching of the automatic exploded paths generation could lead to such a 3D result.

Figure 4:
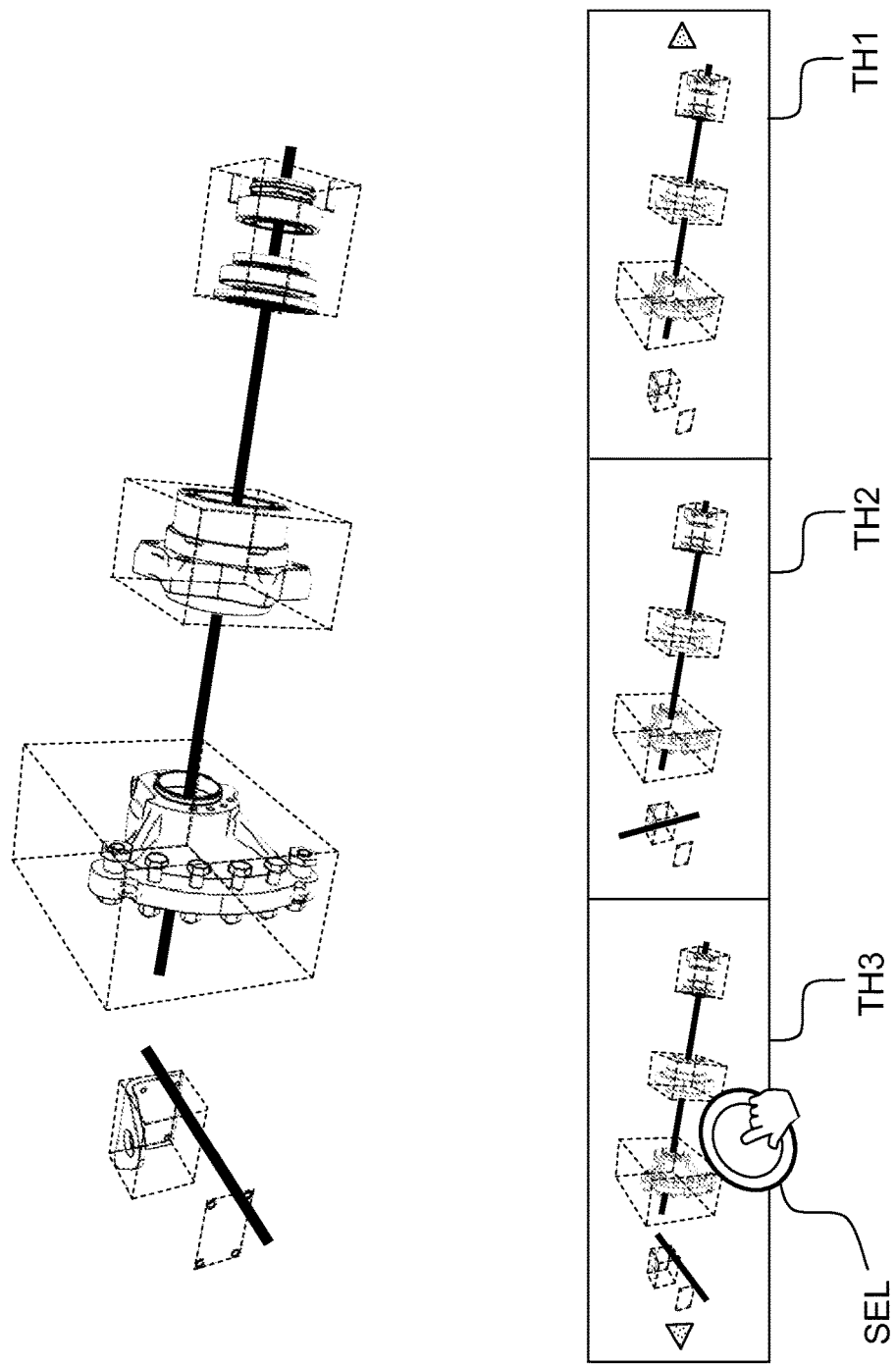

Like illustrated on FIG. 4, a choice selector SEL is displayed, neither automatically, or by a specific action of the user.

On the example, the choice selector SEL is represented by a disc with a superimposed hand, and can be controlled by pointing means, like a computer mouse, a touchpen, or a sensitive touchscreen.

The user can, by a first interaction, for example by hovering a thumbnail or making a first click on a thumbnail, preview a thumbnail of the list LIST of thumbnails. In the present case, the user previews the left thumbnail TH3 of the list LIST, which is the third thumbnail, taking into account the scheduling criterion.

Then, with a second interaction, the user can select the thumbnail TH3 of the list LIST that he wants as set of exploded paths, for example with a click or a double-click.

Thus, the user can make several previews before selecting the set of exploded paths in the list LIST.

Figure 5:
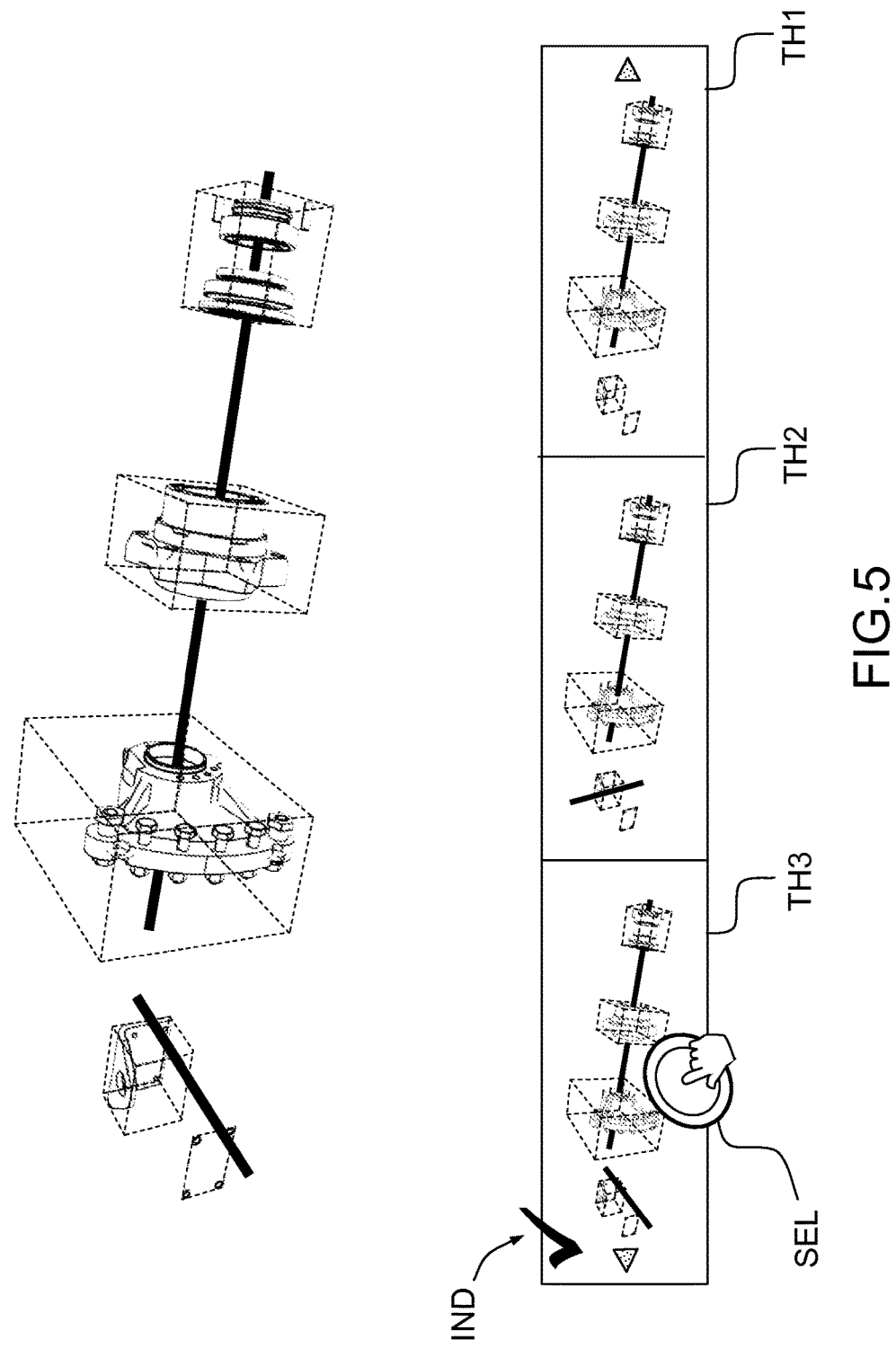

When the user makes this selection, an indicator IND can appears, like illustrated on FIG. 5, and after the validation of the choice, the choice selector SEL can disappear.

Figure 6:
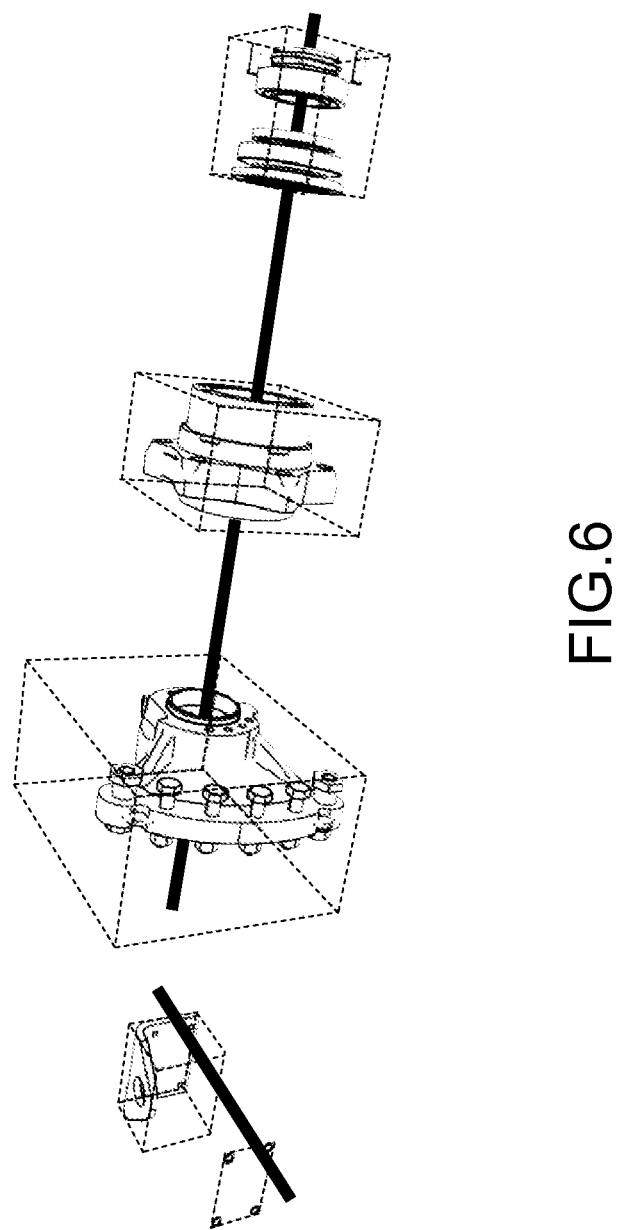

Finally, as illustrated on FIG. 6, the chosen set of exploded paths is displayed. As in the present example, the selected thumbnail is displayed by replacement in the main frame.

Figure 7:
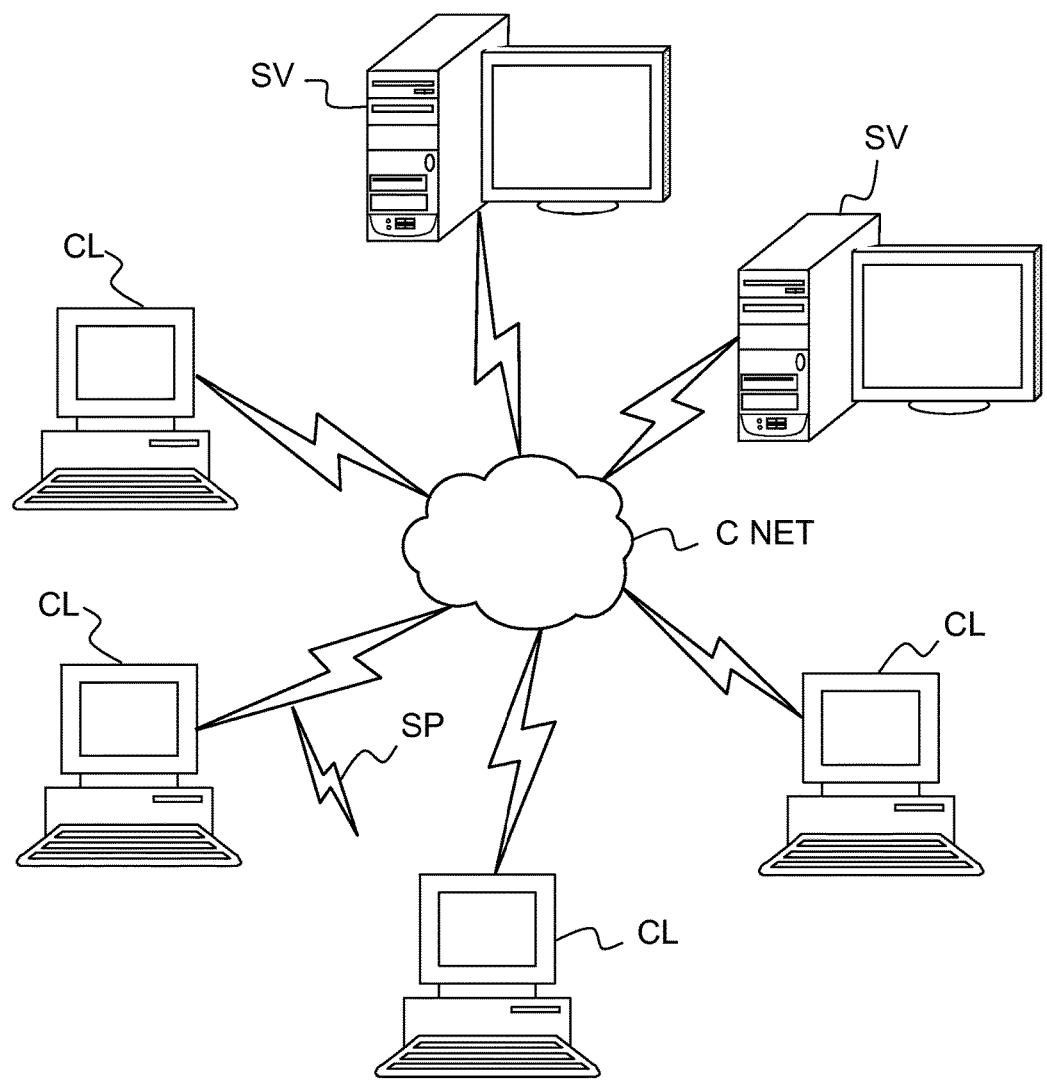
FIG. 7 illustrates a computer network or similar digital processing environment in which the present invention may be implemented.

FIG. 7 illustrates a computer network or similar digital processing environment in which the present invention may be implemented.

Client computer(s)/devices CL and server computer(s) SV provide processing, storage, and input/output devices executing application programs and the like. Client computer(s)/devices CL can also be linked through communications network CNET to other computing devices, including other client devices/processes CL and server computer(s) SV. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 8:
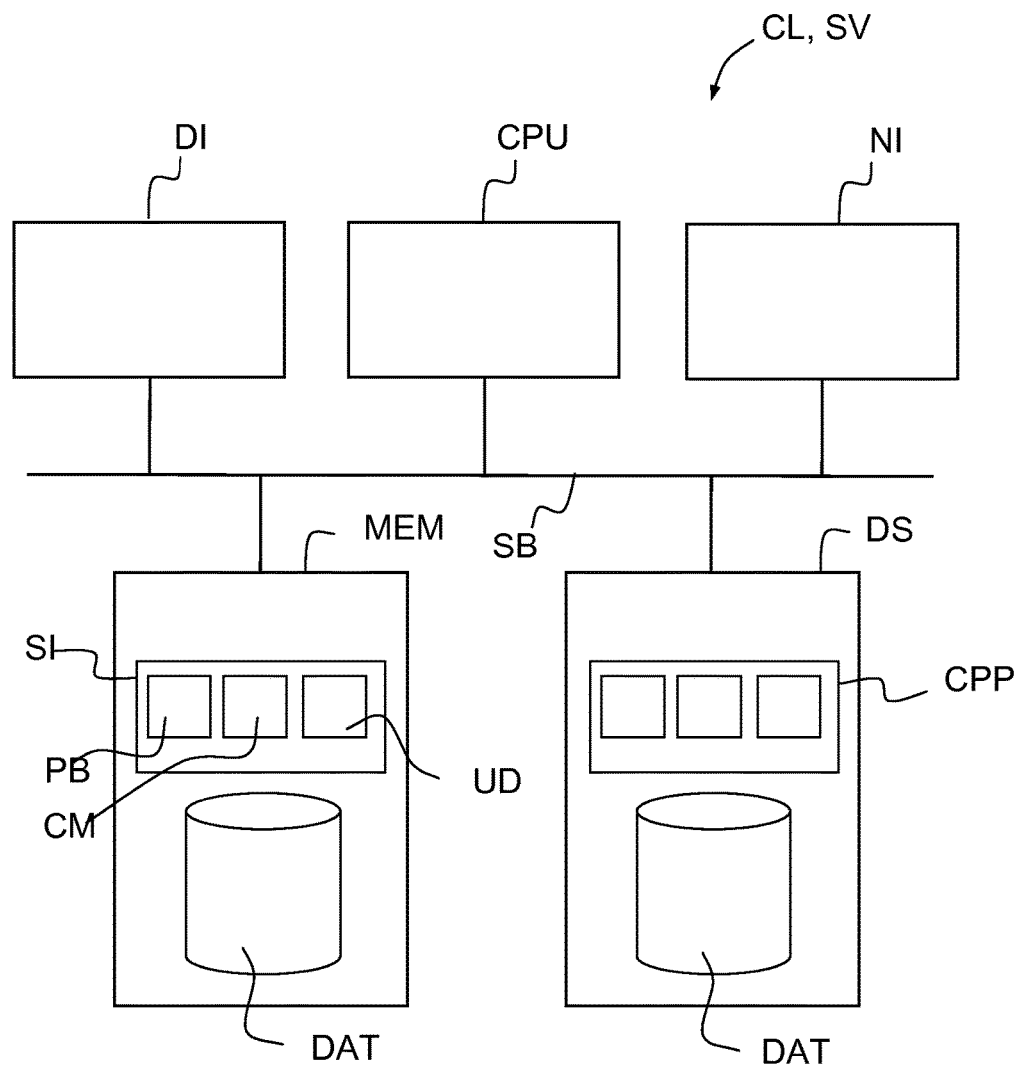
FIG. 8 illustrates a diagram of the internal structure of a computer.

FIG. 8 is a diagram of the internal structure of a computer (e.g., client processor/device CL or server computers SV) in the computer system of FIG. 7. Each computer CL, SV contains system bus SB, where a bus is a set of hardware lines used for data transfer among the components of a computer or processing system. Bus SB is essentially a shared conduit that connects different elements of a computer system (e.g., processor, disk storage, memory, input/output ports, network ports, etc. . . . ) that enables the transfer of information between the elements.

Attached to system bus SB is I/O device interface DI for connecting various input and output devices (e.g., keyboard, mouse, displays, printers, speakers, etc.) to the computer CL, SV. Network interface NI allows the computer to connect to various other devices attached to a network (e.g., network CNET of FIG. 7).

Memory MEM provides volatile storage for computer software instructions SI and data CPP used to implement an embodiment of the present invention (e.g., a first path builder PB, means CM for computing a second path, an updater UD implementing the method discussed in FIGS. 1 to 6, and supporting code detailed above).

Disk storage DS provides non-volatile storage for computer software instructions SI and data DAT used to implement an embodiment of the present invention. Central processor unit CPU is also attached to system bus SB and provides for the execution of computer instructions.

In one embodiment, the processor routines SI and data DAT are a computer program product (generally referenced CPP), including a computer readable medium (e.g., a removable storage medium such as one or more DVD-ROM's, CD-ROM's, diskettes, tapes, etc. . . . ) that provides at least a portion of the software instructions for the invention system. Computer program product CPP can be installed by any suitable software installation procedure, as is well known in the art.

In another embodiment, at least a portion of the software instructions may also be downloaded over a cable, communication and/or wireless connection. In other embodiments, the invention programs are a computer program propagated signal product SP embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program CPP.

In alternate embodiments, the propagated signal is an analog carrier wave or digital signal carried on the propagated medium. For example, the propagated signal may be a digitized signal propagated over a global network (e.g., the Internet), a telecommunications network, or other network.

In one embodiment, the propagated signal is a signal that is transmitted over the propagation medium over a period of time, such as the instructions for a software application sent in packets over a network over a period of milliseconds, seconds, minutes, or longer.

In another embodiment, the computer readable medium of computer program product CPP is a propagation medium that the computer system CL may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for producing an illustration based on an assembly of three-dimensional modeled objects by determining exploded paths of an exploded view of the assembly of three-dimensional modeled objects, the method comprising:

displaying, in a main frame of a graphical user interface (GUI) of a computer aided design (CAD) system, an exploded view of the assembly in a three-dimensional scene;

automatically computing different exploded paths, each exploded path comprising at least one exploded line, the at least one exploded line of each exploded path based on at least one geometrical criterion, the geometrical criterion including at least a preferred direction of parts of a representation of one of the computed exploded paths of the assembly, each exploded path including a plurality of exploded lines linking objects of the assembly, each of said exploded paths corresponding to a respective order for mounting or dismounting said objects of the assembly;

simultaneously displaying a second frame of the GUI and the main frame of the GUI, the second frame displaying a list of thumbnails, each thumbnail of the list displaying the exploded view of the assembly and one of the automatically computed exploded paths;

automatically preselecting, within the GUI, a default thumbnail, of the list of thumbnails, having a best value of the geometrical criterion;

enabling a user to select, within the GUI, one thumbnail among the list of thumbnails; and producing the illustration displaying the exploded path of the selected thumbnail in the main frame of the GUI.

2. The computer-implemented method according to claim 1, wherein the at least one exploded line of each exploded path comprises one or more of:

at least one line linking two positions of at least one object, being a segment or a curve; and at least one custom line comprising at least one line with a constraint set of at least one geometrical constraint.

3. The computer-implemented method according to claim 2, wherein said constraint set comprises at least one constraint among a passage area, a waypoint, an axis, an avoid area, and an avoid point.

4. The computer-implemented method according to claim 1, wherein enabling the user to select the one thumbnail among the list of thumbnails is preceded by previewing at least one thumbnail of the list of thumbnails.

5. The computer-implemented method according to claim 1, wherein displaying the selected thumbnail is performed by replacing a current view in the main frame.

6. The computer-implemented method according to claim 5, wherein enabling the user to select one thumbnail among the list of thumbnails is preceded by previewing at least one thumbnail of the list of thumbnails in the main frame.

7. The computer-implemented method according to claim 1, wherein enabling selection of selecting one thumbnail among the list of thumbnails comprises using a choice selector.

8. The computer-implemented method according to claim 7, wherein the choice selector is adapted to be controlled by pointing means.

9. The computer-implemented method according to claim 7, further comprising previewing the exploded path of a selected thumbnail by using a first interaction with the choice selector;

wherein selecting uses a second interaction with the choice selector.

10. A computer system comprising:
a processor; and
a non-transitory readable medium having computer-executable instructions that cause the processor to producing an illustration based on an assembly of three-dimensional modeled objects by determining exploded paths of an exploded view of the assembly of three-dimensional modeled objects by:

displaying, in a main frame of a graphical user interface (GUI) of a computer aided design (CAD) system, an exploded view of the assembly in a three-dimensional scene;

automatically computing different exploded paths, each exploded path comprising at least one exploded line, the at least one exploded line of each exploded path based on at least one geometrical criterion, the geometrical criterion including at least a preferred direction of parts of a representation of one of the computed exploded paths of an assembly, each exploded path including a plurality of exploded lines linking objects of the assembly, each of said exploded paths corresponding to a respective order for mounting or dismounting said objects of the assembly;

simultaneously displaying a second frame of the GUI and the main frame of the GUI, the second frame displaying a list of thumbnails, each thumbnail of the list displaying the exploded view of the assembly and one of the automatically computed exploded paths;

automatically preselecting, within the GUI, a default thumbnail, of the list of thumbnails, having a best value of the geometrical criterion;

enabling a user to select, within the GUI, one thumbnail among the list of thumbnails; and producing an illustration displaying the exploded path of the selected thumbnail in the main frame of the GUI.

11. A computer program product, comprising:
a non-transitory computer readable medium, for producing an illustration based on an assembly of three-dimensional modeled objects by determining exploded paths of an exploded view of the assembly of three-dimensional modeled objects, comprising instructions; and the instructions causing one or more computers to: display, in a main frame of a graphical user interface (GUI) of a computer aided design (CAD) system, an exploded view of the assembly in a three-dimensional scene;

automatically compute different exploded paths, each exploded path comprising at least one exploded line, the at least one exploded line of each exploded path based on at least one geometrical criterion, the geometrical criterion including at least a preferred direction of parts of a representation of one of the computed exploded paths of an assembly, each exploded path corresponding to a plurality of exploded lines linking objects of the assembly, each of said exploded paths corresponding to a respective order for mounting or dismounting said objects of the assembly;

simultaneously display a second frame of the GUI and displaying the main frame of the GUI, the second frame displaying a list of thumbnails, each thumbnail of the list displaying the exploded view of the assembly and one of the automatically computed exploded paths;

automatically preselect, within the GUI, a default thumbnail, of the list of thumbnails, having a best value of the geometrical criterion;

enable a user to select, within the GUI, one thumbnail among the list of thumbnails; and producing the illustration displaying the exploded path of the selected thumbnail in the main frame of the GUI.

12. A computer apparatus for producing an illustration based on an assembly of three-dimensional modeled objects by determining exploded paths of an exploded view of the assembly of three-dimensional modeled objects comprising:

a processor for automatically computing different exploded paths of an exploded view of the assembly in a scene, each exploded path comprising at least one exploded line, the at least one exploded line of each exploded path based on at least one geometrical criterion, the geometrical criterion including at least a preferred direction of parts of a representation of one of the computed exploded paths of an assembly, each exploded path of a list including one or more exploded lines linking at least one object of the assembly, each of said exploded paths corresponding to a respective order for mounting or dismounting said objects of the assembly;

a display for displaying, simultaneously within a single graphical user interface (GUI), a main frame and a second frame, the main frame displaying the exploded view of the assembly in the scene, and the second frame displaying a list of thumbnails, each thumbnail of the list displaying the exploded view of the assembly and one of the automatically computed exploded paths;

wherein the processor further automatically preselects, within the GUI, a default thumbnail, of the list of thumbnails, having a best value of the geometrical criterion;

an input device for enabling a user to select, within the GUI, one thumbnail among the list of thumbnails displayed in the second frame, wherein the processor produces the illustration including the exploded path of the selected thumbnail; and the display further responsively displaying the illustration of the exploded path of the selected thumbnail in the main frame of the GUI.

* * * * *